United States Patent [19]

Ōhama

[11] 4,352,090
[45] Sep. 28, 1982

[54] DETECTION AND ALARM DEVICE FOR USE WITH CAR FOR DETECTING OBSTACLE AND ABNORMAL CONDITIONS OF TIRE

[76] Inventor: Satoru Ōhama, No. 5-59, Tachibanadai 1-chome, Midori-ku, Yokohama-shi, Kanagawa-ken, Japan

[21] Appl. No.: 230,294

[22] Filed: Jan. 30, 1981

[51] Int. Cl.³ .................... B60C 23/00; G08B 19/00
[52] U.S. Cl. ................................. 340/52 R; 340/58; 340/563
[58] Field of Search .................. 340/31 R, 33, 38 R, 340/52 R, 52 H, 58, 61, 510, 561, 562, 563

[56] References Cited

U.S. PATENT DOCUMENTS

| | | | |
|---|---|---|---|
| 1,870,181 | 8/1932 | Mallory | 340/563 |
| 2,274,557 | 2/1942 | Morgan et al. | 340/58 |
| 3,895,347 | 7/1975 | Takusagawa et al. | 340/58 |
| 4,072,926 | 2/1978 | Shimahara et al. | 340/58 |
| 4,240,061 | 12/1980 | Cohen | 340/58 |

Primary Examiner—Alvin H. Waring
Attorney, Agent, or Firm—Hill, Van Santen, Steadman, Chiara & Simpson

[57] ABSTRACT

An automobile detection and alarm device detects obstacles near the automobile and abnormal conditions of tires on the automobile. An oscillator is provided which either oscillates or does not oscillate depending upon the value of a capacitance present between first and second electrodes. Preferably one of the electrodes is connected to the automobile body and the other electrode is either grounded or is connected to an antenna which is mounted on the automobile but insulated therefrom. Obstacles near the car change the effective capacitance between the two electrodes either by providing a dielectric effect or by acting themselves as an extension of electrical ground. In order to detect abnormal pressure of tires, the capacity between the car body and ground or between a steel portion of a steel radial tire and ground is detected.

15 Claims, 8 Drawing Figures

DETECTION AND ALARM DEVICE FOR USE WITH CAR FOR DETECTING OBSTACLE AND ABNORMAL CONDITIONS OF TIRE

BACKGROUND OF THE INVENTION

1. Field of the Invention

This invention generally relates to an alarm system for use with a vehicle, such as a car, a truck, etc. More particularly, the invention relates to a detection and alarm device for use with a car for detecting obstacles located near the car during driving or parking to issue an alarm, and/or for detecting abnormal conditions of the tire such as a puncture in the tire or a decreased air pressure in the tire to issue an alarm.

2. Description of the Prior Art

Conventionally, a confirmation as to whether obstacles are located near the car during driving or parking has been made by utilizing mirrors, ultrasonic waves, insulation resistance, etc.

With the mirrors, it is difficult to make a confirmation without fail and in addition there are dead angles, which would result in many accidents. The ultrasonic wave system can detect only obstacles in a specific direction. Furthermore, although the insulation resistance system is of an omnidirectional type, it cannot make a detection unless it contacts obstacles.

SUMMARY OF THE INVENTION

It is, therefore, a main object of the present invention to provide a detection and alarm device for use with a car which can make an omnidirectional detection without contact with obstacles.

It is another object of the invention to provide a detection and alarm device of the above type in which accidents due to a collision between a car and an obstacle and robberies of cars can be prevented and at the same time abnormal conditions of the tire of the car such as puncture in the tire or decreased air pressure in the tire can be detected.

According to the present invention, there is provided a detection and alarm device for use with a car for detecting an obstacle to issue an alarm which comprises detection and alarm means for detecting a variation of capacitance measured between two electrodes of said means to issue an alarm, one of said electrodes being connected to any suitable member of the car and the other of said electrodes being grounded to the earth, whereby variation of the distance between the car and the obstacle is detected as variation of capacitance by said means to issue an alarm.

Herein disclosed is a detection and alarm device for use with a car. The detection and alarm device is constructed so that it detects a variation of capacitance measured between two electrodes of the detection and alarm device to issue an alarm. One electrode of the device is connected to the body of the car and the other electrode is grounded to the earth. Alternatively, the electrodes may be connected to two members of the car which are insulated form each other. When the car comes toward or away from an obstacle which may be conductive or insulating, or when the obstacle comes toward or away from the car, the capacitance measured between the two electrodes varies, and therefore, the device issues an alarm. Furthermore, one electrode is disposed on the side surface of the tire and is connected to the body through a switch which is closed when the tire is punctured or the air pressure in the tire decreases and the other electrode is disposed opposite to said one electrode. In such a case, when the tire is punctured, etc., the device also detects a variation of capacitance between the two electrodes to activate an alarm. Alternatively, one electrode may be connected to the steel portion of the steel radial tire and the other electrode may be grounded to the earth so as to detect low pressure or an obstacle such as a nail. Switches may be provided in the device so that the detection of obstacles and the detection of abnormal conditions of the tire can be made by operations of the switches.

BRIEF DESCRIPTION OF THE DRAWINGS

Objects and advantages of the present invention will become apparent from the following description taken in conjunction with the accompanying drawings in which.

DESCRIPTION OF THE PREFERRED EMBODIMENTS

Embodiments of the present invention will now be described in detail with reference to the accompanying drawings.

Figure 1:
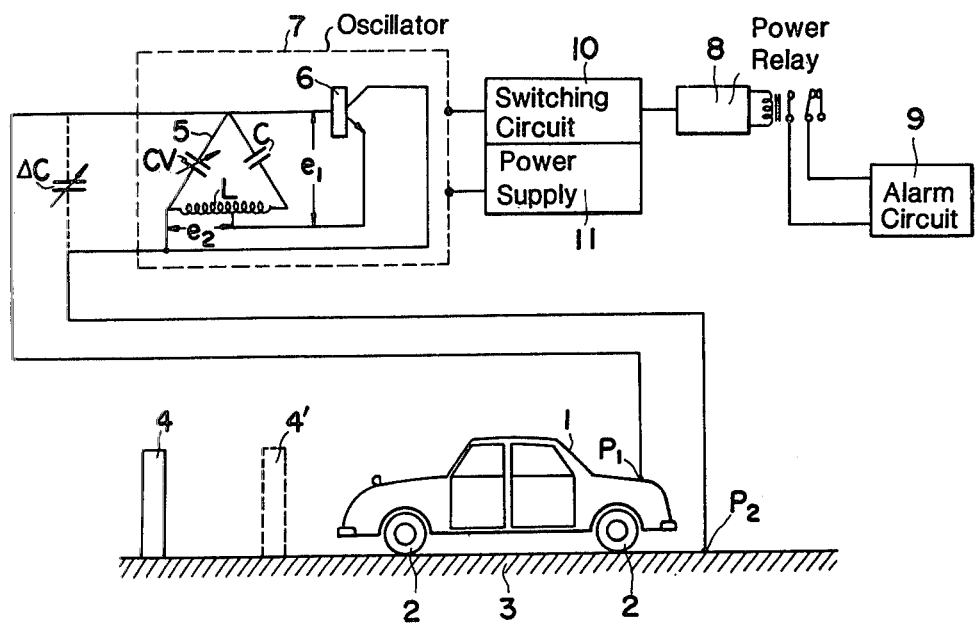
FIG. 1 is a diagrammatical view showing one embodiment of a detection and alarm device and a car in which the device is used.

Referring to FIG. 1, there is shown a detection and alarm device and a car in which the device is used. The detection and alarm device has two detecting electrodes $P_1$ and $P_2$. One of the electrodes $P_1$ is electrically connected to the body 1 of the car and the other electrode $P_2$ is electrically grounded to the earth 3. Alternatively, the other electrode $P_2$ may be made to be at the same potential as the earth or made to be in a condition equivalent to the grounded earth. Herein, "grounded to the earth" means "made to be at the same potential as the earth" or "made to be in a condition equivalent to the grounded earth" as well as "actually grounded to the earth". Although the detection and alarm device is shown to be located outside of the car, this is only for an illustration and the device is actually disposed in any suitable position within the car. The tire 2 of the car intervenes as an insulator between the body 1 and the earth 3, that is, the electrodes $P_1$ and $P_2$. An obstacle 4 located on the earth virtually forms a portion of the electrode $P_2$ and atmospheric air functions as a dielectric. For sake of explanation, the obstacle 4 will be first explained as a conductor. When the car comes toward or away from the obstacle 4, or when the obstacle 4 comes toward or away from the car, the capacitance ΔC measured between the electrodes $P_1$ and $P_2$ varies in accordance with the distance between the car 1 and the obstacle 4. The electrodes $P_1$ and $P_2$ are connected to an oscillator 7 which comprises a bridge circuit 5 and a transistor 6. The bridge circuit 5 is constructed of a variable capacitor CV for adjustment, a standard capacitor C and an inductor L. The oscillation of the oscillator 7 is controlled by the bridge circuit 5. The oscillator 7 is connected to a power relay 8 through a switching circuit 10. The switching circuit 10 rectifies and amplifies an oscillated voltage from the oscillator 7 so as to send the voltage thus amplified to the power relay 8. The power relay 8 is switched on or off in accordance with the voltage from the oscillator 7 through the switching circuit 10. The power relay 8 is connected to an alarm circuit 9 which is closed or open in response to "ON" or "OFF" of the power relay 8. Further, a DC power supply 11 is provided for supplying DC power to the oscillator 7, the switching circuit 10, and the like.

In the construction mentioned above, when the body 1 of the car is away from the obstacle 4 at a distance greater than a predetermined value, the relationship among capacitance ΔC measured between the electrodes $P_1$ and $P_2$, capacitance CV of the variable capacitor and capacitance C of the standard capacitor is that C is greater than CV plus ΔC. For this, the voltage $e_1$ (voltage between the base and the emitter of the transistor 6) is opposite in polarity to the voltage $e_2$ (voltage between the collector and the emitter of the transistor 6). Therefore, the voltage $e_1$ is inverted and amplified through the transistor 6 to be positively fed back to the base of the transistor 6 through the bridge circuit 5. As a result, the oscillator 7 fulfills the oscillating conditions and sends the oscillated voltage to the power relay 8 to cause the same to be off. Thus, the alarm circuit 9 is open and does not issue an alarm.

On the other hand, when the body 1 of the car comes near the obstacle 4' as shown in dotted lines of FIG. 1 up to a predetermined distance, the capacitance ΔC measured between the electrodes $P_1$ and $P_2$ increases and the resultant capacitance CV plus ΔC becomes equal to the capacitance C. As a result, the bridge circuit 5 is made to be balanced to cause the oscillator to stop its oscillation since the voltage $e_1$ becomes zero. Thus, the power relay 8 is switched on to cause the alarm circuit 9 to be closed and thereby issuing an alarm.

Furthermore, when the body 1 of the car comes nearer the obstacle 4 and the distance therebetween decreases further, the resultant capacitance CV plus ΔC becomes greater than the capacitance C. At the time, since the voltages $e_1$ and $e_2$ becomes the same in porality, the voltage $e_1$ is negatively fed back through inversion and amplification of the transistor 6 and then the oscillator 7 still stops its oscillation. Thus, the power relay 8 remains on to cause the alarm circuit 9 to maintain an issuance of the alarm.

To summarize, when the body 1 of the car comes near any obstacle a distance therebetween less than a predetermined value, the alarm circuit 9 is closed to issue an alarm.

Figure 2:
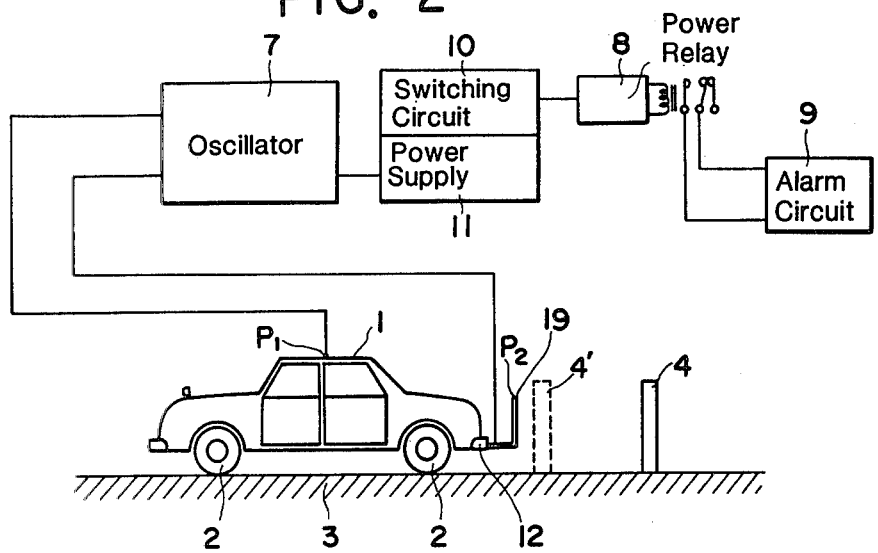
FIG. 2 is a diagrammatical view similar to FIG. 1, but showing another embodiment of the present invention.

Referring now to FIG. 2 showing another embodiment, one electrode $P_1$ is connected to the body 1 of the car while the other electrode $P_2$ is connected to an antenna 19 which is mounted on the bumper 12 of the car and insulated from the body. In this embodiment, the capacitance ΔC measured between the electrodes $P_1$ and $P_2$ also varies in accordance with the relative movement between the car and the obstacle in a similar manner to the above embodiment of FIG. 1 and thus, variation of the capacitance ΔC is utilized to issue an alarm by the alarm circuit 9 through the oscillator 7, the switching circuit 10, and the power relay 8 which are constructed in a similar manner to those of FIG. 1.

Further, the electrodes $P_1$ and $P_2$ may be mounted on any two members such as the body, the trunk, the door, the bonnet which are insulated from each other. Furthermore, one of two electrodes $P_1$ or $P_2$ may be grounded to the earth.

Figure 3A:
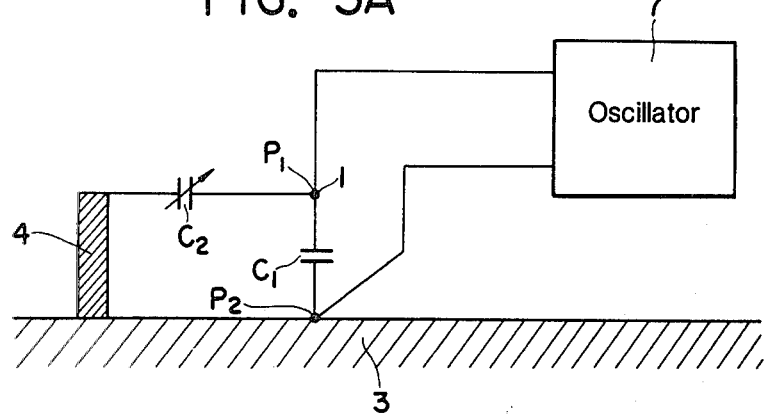
FIGS. 3A and 3B are equivalent circuits showing relationship between the electrodes of the detection and alarm device and capacitance measured between the electrodes for explanation on functions of the device.
Figure 3B:
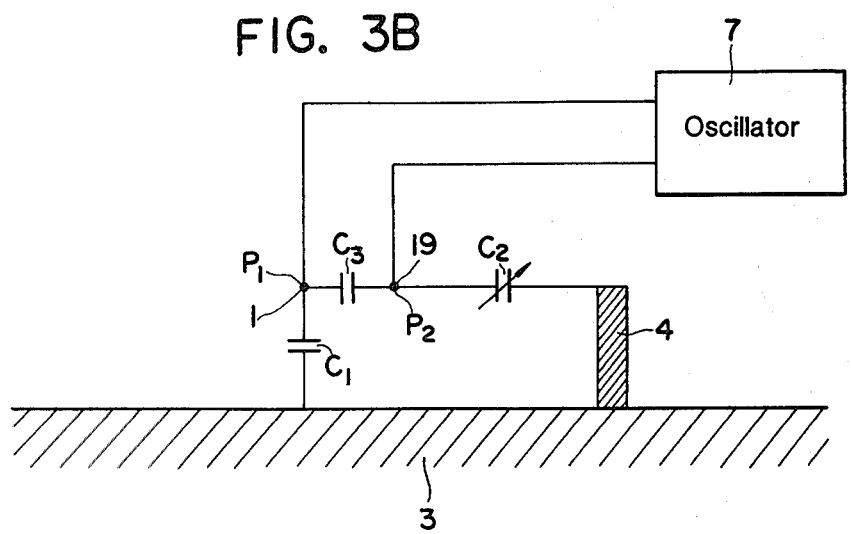

Turning now to FIGS. 3A and 3B showing relationship between the electrodes of the detection and alarm device and capacitance measured therebetween, FIG. 3A shows an equivalent circuit corresponding to the embodiment of FIG. 1 and FIG. 3B shows an equivalent circuit corresponding to the embodiment of FIG. 2.

In FIG. 3A, the capacitance $C_1$ between the body 1 and the ground 3, and the capacitance $C_2$ between the body 1 and the obstacle 4 are measured as the resultant capacitance ΔC between the electrodes $P_1$ and $P_2$ and the capacitance ΔC is calculated by the following formula:

$$\Delta C = C_1 + C_2$$

When the body 1 of the car comes toward or away from the obstacle 4, the capacitance $C_2$ varies and thus, the capacitance ΔC varies. As a result, the variation of the capacitance is detected by the detection and alarm device, as already mentioned above.

In FIG. 3B, the capacitance $C_1$ between the body 1 and the earth 3, the capacitance $C_2$ between the antenna 19 and the obstacle 4, and the capacitance $C_3$ between the antenna 19 and the body 1 are measured as the resultant capacitance between the electrodes $P_1$ and $P_2$, and the capacitance ΔC is calculated by the following formula:

$$\Delta C = C_3 + \frac{C_1 + C_2}{C_1 C_2}$$

When the body 1 of the car comes toward or away from the obstacle 4, the capacitance $C_2$ varies and, therefore, the capacitance ΔC varies. In a similar manner to the embodiment of FIG. 3A, the variation of the capacitance is detected by the detection and alarm device.

Further, since the above explanation is merely intended to be made roughly so as to give a basic idea of variation of the capacitance measured between the electrodes, the other stray capacitances which are negligible are omitted herein.

Although, in the above embodiments, the explanation has assumed that the obstacle is considered to be conductive, the detection and alarm device of the present invention can be equally applied to the case where the obstacle is of an insulating material since the variation of the resultant capacitance ΔC still results. In such a case, the obstacle is considered to serve as a dielective material intervening between the electrodes.

Figure 4:
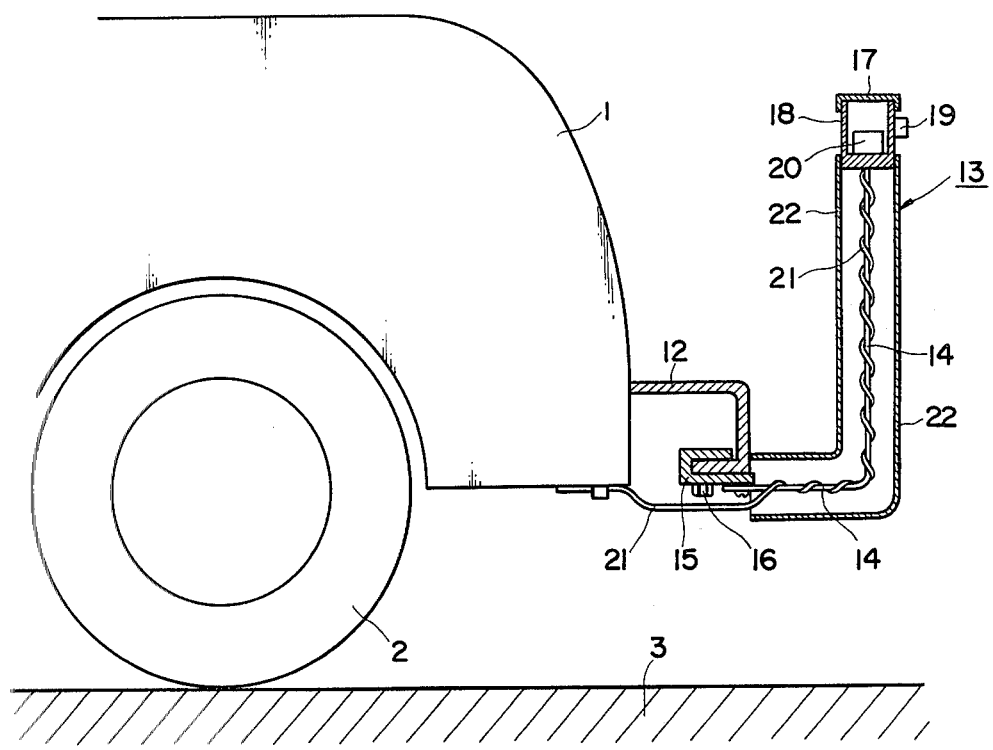
FIG. 4 is a vertically cross-sectional view showing an antenna assembly used in connection with the detection and alarm device of FIG. 2.

Referring now to FIG. 4 showing an antenna assembly used in connection with the detection and alarm device of the embodiment of FIG. 2, antenna assembly 13, only one half section of which is shown in FIG. 4 for clarity of illustration, is removably mounted on the rear bumper 12 of the car at the opposite sides thereof. Each half section of antenna assembly 13 is provided with a fastening 15 at the lower end of an L-shaped rod-spring 14. The fastening 15 is made to be U-shaped and is fitted onto the inwardly bent lower edge of the bumper 12 so as to be rigidly secured thereon by means of bolts.

Secured to the rod-spring 12 at the top portion thereof is a cylinder 18 made of an insulator material and having a cap 17. A metal tape 19 which forms an antenna is secured at the opposite sides thereof to the half sections of antenna assembly 13 at the side surfaces of the cylinders 18 so that it is bridged between the half sections of antenna assembly 13. The metal tape 19, that is, the antenna serves as the electrode $P_2$ which has already discussed above. The metal tape 19 is electrically connected to a local amplifier 20 which in turn is connected to the detection and alarm device by a wire 21. Provided around the rod-spring 14 is a synthetic-resin tube 22 for preventing the rod-spring 14 and the wire 21 from being damaged.

In the embodiment, even if the car comes very near the obstacle and the antenna assemblies collide against the obstacle, the impact force due to the collision between the antenna assembly and the obstacle is almost absorbed because of resiliency of the rod-spring, and when the antenna assembly is away from the obstacle, the antenna assembly returns to its initial position. Therefore, there is no damage to the antenna assembly.

Further, even if the metal tape 19 is engaged with the obstacle, the obstacle does not contact with the car body because of separation of the metal tape from the body 1 of the car, which would otherwise cause damages to the car body.

Furthermore, the antenna assembly is simple in construction and can be readily mounted on the bumper of any type.

Figure 5:
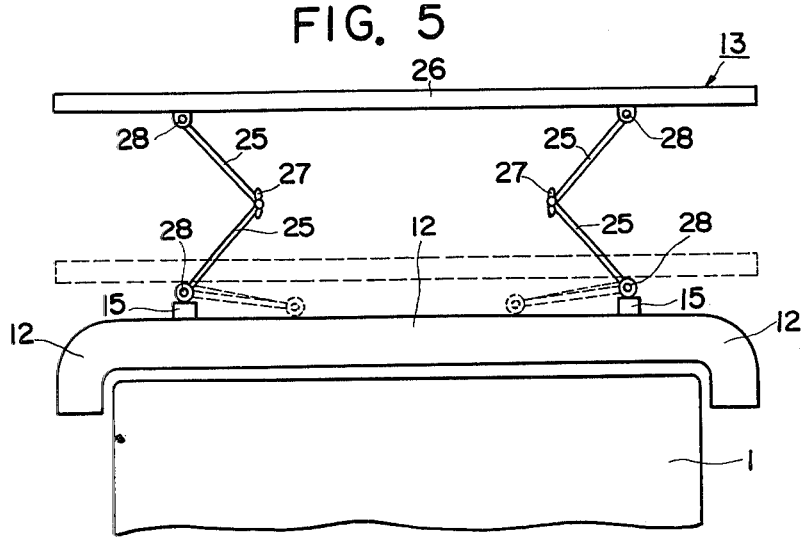
FIG. 5 is a plan view showing another embodiment of an antenna assembly similar to that of FIG. 4.

FIG. 5 shows another embodiment of an antenna assembly different in construction from that of FIG. 4. The antenna assembly 13 is of a telescopic construction which will be described in detail below. In the antenna assembly 13, a pair of fastenings 15 are removably mounted on the bumper 12 at the opposite sides thereof and foldable spring rods 25 rearwardly extend from the fastenings 15. A metal rod 26 which forms an antenna is secured at the opposite sides thereof to the free end of each spring rod 25. The spring rod 25 is made to be foldable at its intermediate portion and two sections of the spring rod 25 can freely vary with its angle encompassed therebetween and can be secured in a specific angular position by a wing nut or a wing bolt 27 provided at the intermediate portion of the spring rod. The spring rod are mounted at the both ends thereof on the fastening 15 and the metal rod 26 by means of hinges 28. Consequently, even if the metal rod 26 contacts any obstacle, the metal rod 26 is moved toward the bumper 12 and, therefore, can absorb an impact force. When the metal rod 26 is away from the obstacle, the metal rod 26 returns to its initial position because of resiliency of the spring rods.

Furthermore, when the antenna assembly 13 is not used, the fastenings 15 are removed from the bumper 12 or the antenna assembly 13 is shortened in a folded position as shown in dotted lines of FIG. 5 by releasing the wing nut 27.

Therefore, when the antenna assembly is not used, the metal rod 26 can be held adjacent the bumper 12 and when the antenna assembly is used the metal rod 26 can be projected rearwardly by releasing the wing-nut 27 and secured by tightening the wing nut 27. Consequently, the antenna assembly 13 can be readily extended rearwardly or shorted in a folded position.

Figure 6:
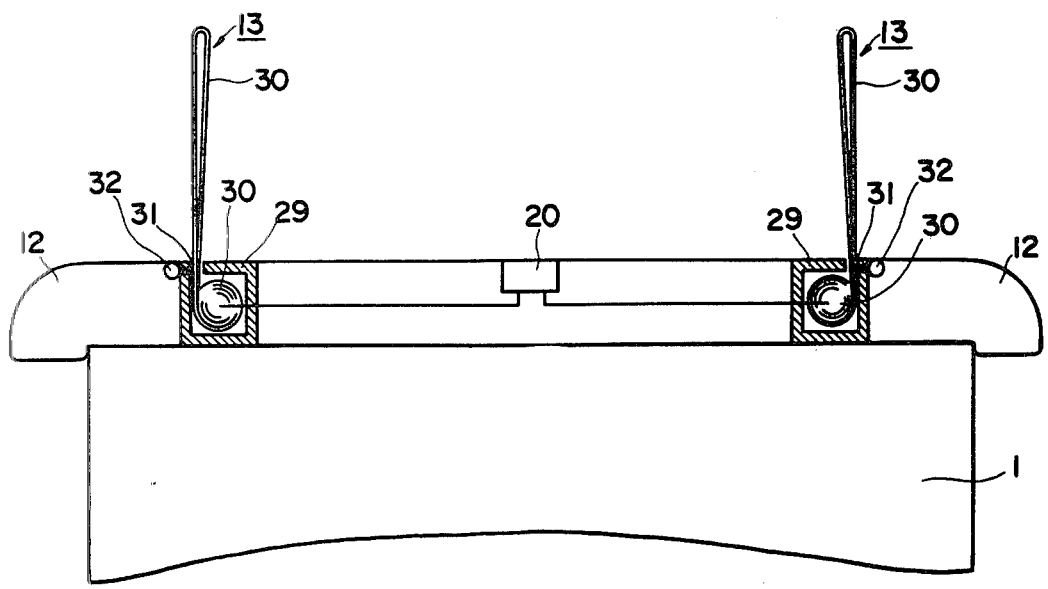
FIG. 6 is a partially cross-sectional plan view showing a still another embodiment of antenna assemblies similar to that of FIG. 4.

FIG. 6 shows a still another embodiment of an antenna assembly different in construction from that of FIG. 4. In the embodiment, there are provided two antenna assemblies 13 which are removably mounted on the rear bumper 12 at the both sides thereof. Since these antenna assemblies are similar, only one of them will be described below. The antenna assembly 13 includes a box 29 removably mounted on the bumper 12. The box 29 accommodates therein a resilient metal tape 30 of a curved configuration in section which forms an antenna and is adapted to be projectable outwardly through a slit 31 of the box 29. The metal tape 30 is projected outwardly and is secured at the base portion to the box 29 by means of a bolt 32 which is screwed into the wall of the box 29. In such a case, even if the free end of the metal tape 30 contacts an obstacle, the metal tape 30 is deformed so as to absorb an impact force and when it is departed from the obstacle, it returns to its original shape because of its resiliency.

When the antenna assembly is not used, the metal tape can be accommodated in the box 29 by releasing the bolt 32.

Furthermore, although two antenna assemblies are illustrated in the embodiment, the present invention is not limited to the number of the antenna assemblies. One or more than two antenna assemblies may also be provided. Furthermore, the box may be disposed in any direction to cause the metal tape to project in any suitable direction.

In the above-mentioned construction, when the car comes near the obstacle 4 during its driving, an alarm is issued as already discussed and a driver can drive the car so as to avoid the obstacle. When any obstacle exists at dead angles relative to the driver on starting, confirmation as to whether a certain obstacle is near the car can be made by the issued alarm and therefore a collision which would otherwise occur can be prevented ahead of time.

Further, when any person comes near the car during parking up to a certain distance less than a predetermined value, the detection and alarm device is operated to issue an alarm. In case a klaxon is incorporated in the alarm circuit of the detection and alarm device, even if the driver is remote from the car, the driver is aware that any other person comes near the car and, therefore, the robbery of the car or mischief on the car can be prevented.

Furthermore, in case where one electrode is adapted to be disposed below the body 1 through an insulator and the other electrode is adapted to be grounded to the earth, when the air pressure in the tire abnormally decreases, the capacitance between the electrodes increases because of downward movement of the body to cause the detection and alarm device to issue an alarm. As the car runs on a bad road, the distance between the electrodes often varies. In such a case, the detection and alarm device may be constructed so that in order to make an accurate detection for puncture or decreased air pressure, it can issue an alarm only when the increments in capacitance measured between the electrodes are maintained for a certain time.

Figure 7:
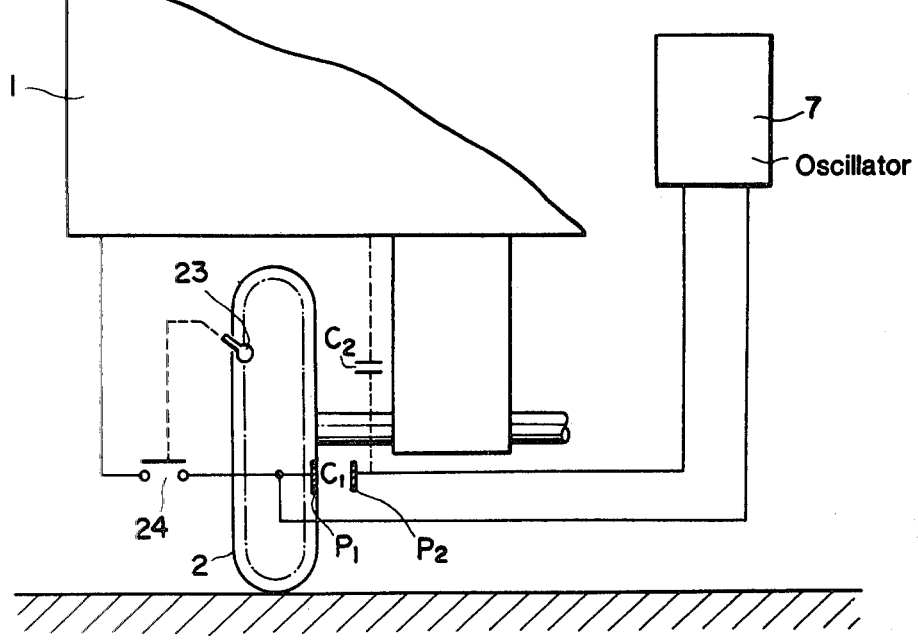
FIG. 7 is a diagrammatical view showing a still another embodiment of the detection and alarm device when used to detect abnormal conditions of the tire.

FIG. 7 shows another embodiment of the detection and alarm device which is adapted to detect abnormal conditions of the tire. One electrode $P_1$ is disposed on the side of the tire 2, and the other electrode $P_2$ is disposed opposite to the electrode $P_1$. These electrodes form a capacitor. A pressure valve 23 is provided at the air injection inlet of the tube within the tire 2 for closing or opening a switch 24 by the movement of its valve body. The switch 24 is connected at one terminal thereof to the electrode $P_1$ and at the other terminal to the car body.

In the above-mentioned construction, when the air pressure in the tire 2 is maintained above a predetermined value, the switch 24 is made to be open and, therefore, the detection and alarm device substantially detects only a capacitance of the capacitor formed by the electrodes $P_1$ and $P_2$. At the time, the device does not issue an alarm. On the other hand, when the air pressure in the tire 2 decreases, the switch 24 is closed by the movement of its valve body to electrically connect the car body 1 to the electrode $P_1$. As a result, in addition to the capacitance of the capacitor pre-formed by the electrodes $P_1$ and $P_2$, the capacitance between the car body and the electrode $P_2$ can be also detected. That is, the capacitance measured by the electrodes $P_1$ and $P_2$ increases and, therefore, the device is actuated to an alarm.

Furthermore, one electrode may be disposed at the steel portion of the steel radial tire and the other electrode may be grounded to the earth. In such a case, when any obstacle such as a nail, etc. enters into the tire, the electrode disposed on the steel portion is conducted to the earth through the obstacle and, therefore, an alarm may be activated without any change in a distance between the electrodes. Consequently, accidents due to a puncture in the tire may be prevented previously through an early discovery.

Further, if the outer surface of the tire is separated from the tire body so that the steel portion is exposed, the electrode disposed on the steel portion is also conducted to the earth to activated an alarm.

Furthermore, it should be noted that in the present invention, a group of switches is provided in the detection and alarm device for making various detections, as already described, by operations of the switches.

According to the present invention, the detection electrodes of the detection and alarm device are connected to the car body and the earth, or to the members of the car which are insulated from each other and the detection electrodes can detect the increments in capacitance by the relative movement between the car and the obstacle to issue an alarm through the oscillator, the power relay and the alarm circuit in order to prevent collision accidents ahead of time, in order to prevent car robbery and in order to detect abnormal conditions of the tire such as puncture or decrease in air pressure.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A method for detecting the approach of an automobile to obstacles, comprising the steps of: providing an automobile, a capacitance change detection means for detecting a variation of capacitance, an alarm means for activating an alarm when the detecting means detects a given variation of capacitance, first and second electrodes connected to the detecting means for measuring a capacitance between the first and second electrodes, and the first electrode being electrically connected to a metal body of the automobile and the second electrode being electrically coupled to ground; and activating the alarm means based upon a capacitance between ground and the automobile body and thus between the electrodes when the automobile approaches an obstacle.

2. The method of claim 1 wherein the second electrode is coupled to ground by an antenna mounted on the automobile body and insulated therefrom.

3. The method of claim 1 wherein the second electrode is directly electrically connected to ground.

4. The method of claim 1 wherein the obstacle is metallic and is an electrical extension of ground so as to cause an increase of capacitance between the first and second electrodes as the car approaches the conducting obstacle.

5. The method of claim 1 wherein the obstacle is formed of an insulating material and provides a dielectric to reduce the capacitance between the car body and ground.

6. The method of claim 1 wherein the detecting means comprises an oscillator designed so that it normally oscillates based on the capacitance between the car body and ground but ceases to oscillate when capacitance between the car body and ground increases.

7. An automobile detection and alarm system, comprising: an automobile; an obstacle; detecting means for determining a variation of capacitance; alarm means connected to the detecting means for activating an alarm when the capacitance varies by a given amount; first and second electrodes connected to the detecting means; the first electrode being connected to a body of the automobile and the second electrode being connected to an antenna mounted to the body in an insulated fashion and spaced therefrom; and the detecting means detecting a capacitance between the first and second electrodes which changes as a result of the car approaching said obstacle.

8. The system of claim 7 wherein the obstacle is conductive and the detecting means detects a change in capacitance formed of a capacitance from the car body to ground in series with a capacitance between the obstacle electrically connected to ground and the antenna.

9. The system of claim 7 wherein the obstacle is nonconductive and acts as a dielectric to increase a capacitance between the antenna and ground so as to increase a capacitance between the antenna and the car body.

10. The system of claim 7 wherein the detecting means comprises an oscillator which is normally oscillating until the capacitance between the first and second electrodes increases at which time the oscillator stops oscillating.

11. A method for detecting automobile tire inflation, comprising the steps of: providing an automobile, a detection means for detecting a variation of capacitance measured between two electrodes connected to the detecting means, and alarm means connected to the detection means for activating an alarm when the capacitance varies by a given amount; connecting the first electrode to a body of the automobile and electrically coupling the second electrode to ground; and detecting a change in capacitance between the first and second electrodes to determine a change in tire inflation as a result of a change of spacing between the automobile body and ground.

12. A method for detecting automobile tire inflation and safety, comprising the steps of: providing an automobile having steel belted tires, detecting means for detecting a variation of capacitance measured between two electrodes connected thereto; and alarm means connected for activating an alarm when the detecting means detects a given variation of capacitance; electrically connecting the first electrode to the steel belt of the steel belted tire and electrically coupling the second electrode to ground such that the detecting means detects an abnormality in the tire as a result of a change of capacitance between the steel belt and ground.

13. The method of claim 12 wherein the second electrode is coupled to ground by an antenna system mounted on the vehicle but insulated therefrom.

14. An automobile detection and alarm system for detecting the approach of an automobile body to an obstacle, comprising: an automobile; an obstacle; detecting means for detecting a variation of capacitance measured between two electrodes connected thereto; alarm means connected to the detection means for activating an alarm when the capacitance varies by a given amount; the first electrode being directly connected to the car body and the second electrode being directly connected to ground; and the detecting means being designed so as to measure a capacitance change between the car body and ground which results when the automobile approaches said obstacle.

15. The system of claim 14 wherein the detecting means comprises an oscillator whose oscillations cease when the automobile approaches beyond a certain point relative to the obstacle.

* * * * *